US011834367B2

(12) United States Patent
Terruzzi et al.

(10) Patent No.: US 11,834,367 B2
(45) Date of Patent: Dec. 5, 2023

(54) OPTICAL FIBRE HAVING A CROSSLINKED POLYESTER COATING

(71) Applicants: Prysmian S.P.A., Milan (IT); Politecnico di Milano, Milan (IT)

(72) Inventors: Lidia Terruzzi, Milan (IT); Pamela De Martino, Milan (IT); Attilio Citterio, Milan (IT); Massimo Gola, Milan (IT)

(73) Assignees: Prysmian S.P.A., Milan (IT); Politecnico di Milano, Milan (IT)

( * ) Notice: Subject to any disclaimer, the term of this patent is extended or adjusted under 35 U.S.C. 154(b) by 738 days.

(21) Appl. No.: 15/733,385

(22) PCT Filed: Jan. 19, 2018

(86) PCT No.: PCT/IB2018/050345
§ 371 (c)(1),
(2) Date: Jul. 17, 2020

(87) PCT Pub. No.: WO2019/142017
PCT Pub. Date: Jul. 25, 2019

(65) Prior Publication Data
US 2021/0094875 A1 Apr. 1, 2021

(51) Int. Cl.
*C03C 25/323* (2018.01)
*C03C 25/106* (2018.01)
(Continued)

(52) U.S. Cl.
CPC ......... *C03C 25/323* (2013.01); *C03C 25/106* (2013.01); *C09D 167/08* (2013.01);
(Continued)

(58) Field of Classification Search
None
See application file for complete search history.

(56) References Cited

U.S. PATENT DOCUMENTS

| 2,552,872 A | 5/1951 | Shechter |
| 3,066,383 A | 12/1962 | Marzocchi et al. |

(Continued)

FOREIGN PATENT DOCUMENTS

| CA | 459839 A | 9/1949 |
| CH | 358063 A | 11/1961 |

(Continued)

OTHER PUBLICATIONS

International Search Report and Written Opinion dated Oct. 1, 2018 in PCT/IB2018/050345, 11 pages.
(Continued)

*Primary Examiner* — Jerry Rahll
(74) *Attorney, Agent, or Firm* — Element IP, PLC

(57) ABSTRACT

An optical fibre comprising: an optical waveguide comprising a glass core surrounded by a glass cladding; a coating surrounding said optical waveguide comprising a polymer material comprising a cured polyester obtained by: (a) esterification of a reactant (A) selected from carboxylic acids, triglycerides, and mixtures thereof, having a C16-C24 aliphatic chain comprising at least two conjugated double bonds, with a reactant (B) selected from polyols having at least 3 hydroxyl groups, the polyols being thermally stable up to 300° C.; (b) curing of the 10 so obtained polyester, in the presence of a transition metal salt, the transition metal being selected from Mn, Fe, Co, Cu, and Ni. Preferably, the step of curing is a thermal curing, preferably up to 300° C. The transition metal salt acts as curing accelerator, i.e. it increases the curing rate so as to match the optical fibre drawing speed, the temperature of the glass exiting the drawing step and the drawing tower height commonly used in industrial plants for optical fibre production.

16 Claims, 1 Drawing Sheet

(51) Int. Cl.
  *C09D 167/08* (2006.01)
  *G02B 6/02* (2006.01)
  *C03C 25/1065* (2018.01)
  *C09D 133/08* (2006.01)
  *C09D 133/10* (2006.01)

(52) U.S. Cl.
  CPC ...... *G02B 6/02395* (2013.01); *C03C 25/1065* (2013.01); *C09D 133/08* (2013.01); *C09D 133/10* (2013.01)

(56) References Cited

U.S. PATENT DOCUMENTS

| | | | | |
|---|---|---|---|---|
| 4,081,411 | A | * | 3/1978 | Hunsucker ............ C08G 63/52 106/218 |
| 4,778,245 | A | | 10/1988 | Ueno et al. |
| 5,146,531 | A | | 9/1992 | Shustack |
| 8,426,021 | B2 | | 4/2013 | Cattron |
| 2002/0132118 | A1 | * | 9/2002 | Hirai ................ C08G 18/4854 428/375 |
| 2002/0151615 | A1 | * | 10/2002 | Tortorello ................ C09D 4/00 522/96 |
| 2002/0168164 | A1 | * | 11/2002 | Bishop .................... C07C 67/60 385/128 |
| 2003/0059618 | A1 | * | 3/2003 | Takai .................... C08G 59/24 428/413 |
| 2005/0161634 | A1 | | 7/2005 | Szum et al. |
| 2007/0246263 | A1 | | 10/2007 | Reitsma |
| 2012/0203026 | A1 | * | 8/2012 | Kawakami ............ C07C 67/347 560/117 |
| 2017/0010412 | A1 | | 1/2017 | Racosky et al. |
| 2017/0267876 | A1 | | 9/2017 | Corten et al. |

FOREIGN PATENT DOCUMENTS

| | | |
|---|---|---|
| CN | 1225660 A | 8/1999 |
| CN | 1314923 A | 9/2001 |
| CN | 101090935 A | 12/2007 |
| CN | 101809047 A | 8/2010 |
| CN | 102439101 A | 5/2012 |
| CN | 106574142 A | 4/2017 |
| EP | 1898044 A2 | 3/2008 |
| GB | 560095 A | 3/1944 |
| JP | S59-197477 A | 11/1984 |
| WO | WO-0002943 A1 | 1/2000 |
| WO | WO-2004087855 A1 | 10/2004 |
| WO | WO-2009143409 A2 | 11/2009 |
| WO | WO-2012100259 A2 | 7/2012 |
| WO | WO-2015047418 A1 | 4/2015 |

OTHER PUBLICATIONS

Office Action dated Mar. 14, 2022 in Indian Patent Application No. 202017035168, 6 pages.
Combined Chinese Office Action and Search Report dated Feb. 14, 2022 in Patent Application No. 201880086988.4 (with English translation), 10 pages.
"Carboxylic acid", New World Encyclopedia, Available online since at least Jul. 7, 2014, 8 pages.
"Fatty Acid", Wikipedia, Dec. 22, 2019, 7 pages.
"Tung oil", Wikipedia, 2015, 4 pages.
Combined Office Action and Search Report dated May 8, 2021 in Chinese Patent Application No. 201680087812.1 (with English translation), 11 pages.
Edgar B. Cahoon et al, Formation of Conjugated delta 8, delta 10-Double Bonds by delta 12-Oleic-acid Desaturase-related Enzymes, The Jounarl of Biological Chemistry, vol. 276, No. 4, 2001, pp. 2637-2643.
Ellen Hornung et al, "Formation of conjugated delta 11 delta 13-double bonds by delta 12-linoleic acid (1,4)-acyl-lipid-desaturase in pomegranate seeds", Eur. J. Biochem, 269, 2002, pp. 4852-4859.
Gexing Shen et al, "Study of UV-Curable Coating for Optical Fibers", Journal of Coatings Technology, vol. 71, No. 891, Apr. 1999, pp. 53-57.
International Search Report and Written Opinion dated Dec. 19, 2016 in PCT/IB2016/054380, 16 pages.
International Search Report dated Dec. 15, 2016 in PCT/IB2016/055389, 3 pages.
International Search Report dated Jan. 4, 2018 in PCT/IB2017/056527, 4 pages.
Office Action dated Aug. 16, 2021 in co-pending U.S. Appl. No. 16/318,282, 11 pages.
Office Action dated Dec. 14, 2020 in abandoned U.S. Appl. No. 16/330,589, 16 pages.
Office Action dated Dec. 31, 2019 in abandoned U.S. Appl. No. 16/330,589, 11 pages.
Office Action dated Dec. 9, 2021 in co-pending U.S. Appl. No. 16/318,282, 17 pages.
Office Action dated Jul. 15, 2020 in abandoned U.S. Appl. No. 16/330,589, 14 pages.
Office Action dated Mar. 22, 2021 in abandoned U.S. Appl. No. 16/330,589, 21 pages.
Steven R. Schmid et al. "Optical Fiber Coatings", DSM Desotech, Chapter 4, 2012, 28 pages.

* cited by examiner

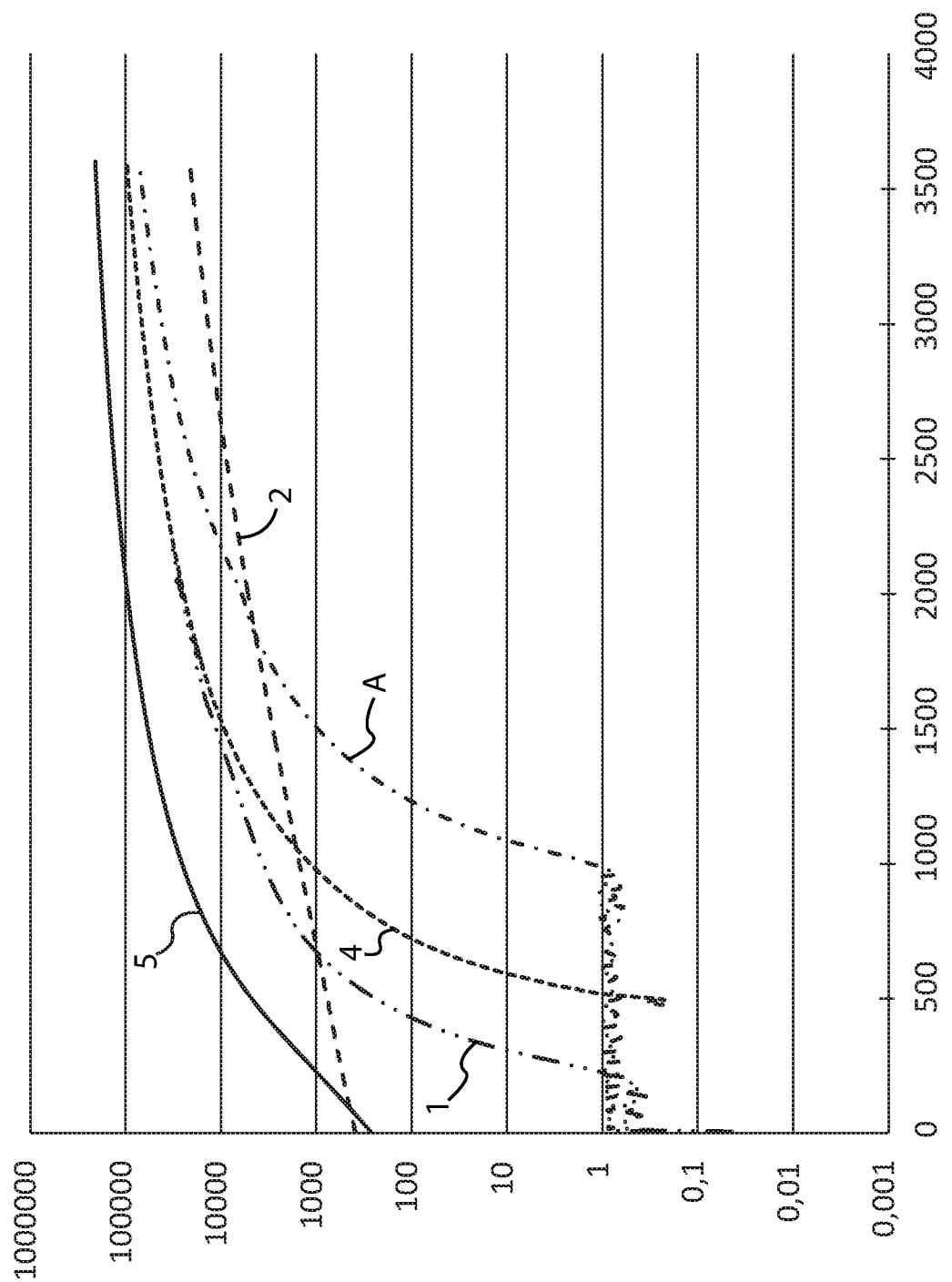

OPTICAL FIBRE HAVING A CROSSLINKED POLYESTER COATING

FIELD OF THE INVENTION

The present invention relates to an optical fibre having a crosslinked polyester coating. The polyester coating can be either radiation cured or, more advantageously, thermally cured. The optical fibre of the present invention is a valuable alternative to the optical fibres coated with conventional polymeric materials that need to be cured by means of radiation at controlled temperature, such as UV-curable acrylate polymer materials.

BACKGROUND OF THE INVENTION

Optical fibres commonly comprise a glass core, inside which the transmitted optical signal is confined, surrounded by a cladding (typically with a diameter of about 120-130 µm), preferably made of glass. The combination of core and cladding is usually identified as "optical waveguide". The optical waveguide is generally protected by a coating, typically of polymeric material, which protects the fibre glass from the external environment and provides resistance to physical handling forces, such as those encountered when the fibre is subjected to cabling operations. The coating typically comprises a first coating layer positioned in direct contact with the cladding, also known as the "primary coating", and at least one second coating layer, also known as "secondary coating", surrounding the first coating. In the art, the combination of primary coating and secondary coating is sometimes also identified as "primary coating system", as both these layer are generally applied during the drawing manufacturing process of the fibre. In this case, the coating in contact with the cladding is called "inner primary coating" while the coating in contact with and surrounding the inner primary coating is called "outer primary coating". In some instance, a single coating can be applied in contact with the cladding. Thereafter, the term "primary coating" shall designate the inner primary coating and the term "secondary coating" shall designate the outer primary coating.

Generally, the primary coating is made of a relatively soft material having a relatively low modulus of elasticity E' at room temperature (typically of from 0.1 MPa to 5 MPa) and a low Tg, for example lower than −20° C. The secondary coating is generally formed by a more rigid polymer having a higher modulus of elasticity E' at room temperature (typically of from 500 MPa to 2000 MPa) and a higher glass transition temperature (Tg) compared to those of the primary coating layer.

For certain applications, optical waveguide may be coated with a single coating layer having modulus of elasticity and Tg values which are intermediate between those of the primary coating and the secondary coating. The overall diameter of the optical waveguide with the primary and secondary coating can be of from 150 µm to 250 µm.

The polymer materials generally used to form primary coatings, secondary coatings and single layer coatings are obtained from compositions comprising acrylate oligomers and monomers that are crosslinked by means of UV radiation in the presence of a suitable photoinitiator. The acrylate polymer coatings, however, should be formed on the optical waveguide at relatively low temperatures, e.g. from ambient temperature to about 50° C., and cured in the presence of an inert atmosphere (e.g. under nitrogen gas) in order to avoid the thermal degradation of the polymer materials and guarantee the proper adhesion of the coating layer to the optical waveguide. These constraints require the use of special apparatuses for controlling the temperature during the polymer deposition and curing process. Typically, radiation curing ovens are continuously flushed with inert gases (e.g. nitrogen or helium) in order to maintain the required conditions.

The need for the above-described stringent operating conditions, apparently, make the manufacturing process of the optical fibres and the apparatus used for carrying out the process thereof rather complex and costly.

SUMMARY OF THE INVENTION

The Applicant has faced the problem of providing a polymer material suitable for forming coating layers on optical fibres that can be cured at a relatively high temperature, either thermally or by radiation, in order to simplify the manufacturing process of coated optical waveguides.

In particular, the Applicant has faced the problem of providing a polymer material suitable for forming coating layers on optical waveguides which is thermocurable, so that it could be applied to the optical waveguide without using radiation devices, such as UV ovens, which require precise temperature control and the presence of inert gas.

The Applicant has found that the above problems and others that will appear more clearly from the following description can be solved by polymer materials which contain certain polyesters as oligomer units that can be cured either by heat or radiation, in the presence of a transition metal salt. The transition metal salt, which may have an inorganic or organic anion as counterion, acts as curing accelerator, i.e. it increases the curing rate so as to match the optical fibre drawing speed, the temperature of the glass exiting the drawing step and the drawing tower height commonly used in industrial plants for optical fibre production.

When cured by heat, the polymer material of the present invention has the advantage of being applicable during the drawing process of the fibre before the drawn fibre is cooled down close to room temperature, and of exploiting the heat of the just drawn glass fibre as heat source for curing.

When cured by radiation, the polymer material of the present invention has the advantage of allowing the use of less controlled operating conditions, particularly during the curing step, because these polymers have less sensitivity to thermal degradation even when cured in the presence of oxygen.

The cured polymer materials of the present invention have mechanical properties, in particular elasticity and adhesion to the glass surface of the fibre, which make the coated optical fibre suitable for use over a wide range of temperatures (e.g. from −60° C. to +150° C.). The coating polymer materials of the present invention can be used as primary, secondary or single coating, preferably as primary and single coatings of optical fibres.

According to the present invention the polyester of the invention can be obtained by an esterification reaction between a selected long-chain unsaturated residue and a selected polyol. By changing the relative ratios of these reactants, polymer materials having the desired mechanical properties can be obtained. The properties of the final polymer can also be adjusted by selecting appropriate curing temperatures and curing times, which influences the crosslinking density of the polymer.

According to a first aspect, therefore, the present invention relates to an optical fibre comprising:

an optical waveguide comprising a glass core surrounded by a glass cladding;

a coating surrounding said optical waveguide comprising a polymer material comprising a cured polyester obtained by:
(a) esterification of a reactant (A) selected from carboxylic acids, triglycerides, and mixtures thereof, having a $C_{16}$-$C_{24}$ aliphatic chain comprising at least two conjugated double bonds, with a reactant (B) selected from polyols having at least 3 hydroxyl groups, the polyols being thermally stable up to 300° C.;
(b) curing of the so obtained polyester, in the presence of a transition metal salt, the transition metal being selected from Mn, Fe, Co, Cu, and Ni.

In an embodiment, the curing of the polyester is carried out thermally, for example, at a temperature up to 300° C.

In an alternative embodiment, the curing of the polyester can be carried out by radiation, for example by UV radiation.

According to a second aspect, the present invention relates to a process for coating an optical fibre comprising:
providing an optical waveguide comprising a glass core surrounded by a glass cladding;
applying a curable coating composition on the cladding, said coating composition comprising a polyester obtained by esterification of a reactant (A) selected from carboxylic acids, triglycerides, and mixtures thereof, having a $C_{16}$-$C_{24}$ aliphatic chain comprising at least two conjugated double bonds, with a reactant (B) selected from polyols having at least 3 hydroxyl groups, the polyols being thermally stable up to 300° C.;
curing said curable coating composition in the presence of a transition metal salt, the transition metal being selected from Mn, Fe, Co, Cu, and Ni, so as to crosslink said polyester and to form the coating.

In an embodiment, the curing of the curable coating composition is carried out thermally, for example, at a temperature up to 300° C.

In an alternative embodiment, the curing of the curable coating composition can be carried out by radiation, for example by UV radiation.

Unlike the known acrylate based optical fibre coatings typically obtained by reacting a polyisocyanate, a (poly) alcohol, a (meth)acrylate monomer and a photoinitiator, often in the presence of viscosity adjusters and/or diluents and/or adhesion promoters, to give a urethane (meth)acrylate oligomer which is admixed at least with a reactive diluent to provide the optical fibre coating material, the optical fibre coating material of the present invention is based on just two classes of main components, reactants A and reactants B. The obtainment of an acrylate based optical fibre coating with mechanical properties suitable, for example, as primary coating implies considering a plethora of variables. The mechanical properties of the coating material of the present invention can be adjusted just by changing the ratios in a given couple reactant A/reactant B.

Such a process allows obtaining a coating for optical fibre having mechanical properties suitable for use as primary coating, secondary coating or single coating, by selecting a certain amount of a reactant A, for example alpha-eleostearic acid, and a certain amount of a reactant B, for example a trimethylolpropane ethoxylate 450, and carrying out an esterification reaction. The resulting polyester is cured and its mechanical properties, for example modulus of elasticity E', glass transition temperature or both, are measured. In the event that such properties do not fit for the coating sought or a coating with different mechanical properties is subsequently required, the ratio (proportion) reactant A/reactant (B) can be changed for obtaining a coating material with the sought mechanical properties.

For the purpose of the present description and of the appended claims, the words "a" or "an" are used to describe elements and components of the invention. This is done merely for convenience and to give a general sense of the invention. This description and claims should be read to include one or at least one and the singular also includes the plural unless it is obvious that it is meant otherwise.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the claims that follow, as "thermally stable up to 300° C." is meant that a substance heated up to 300° C., at atmospheric pressure and in air, has a weight loss from 0 wt % to 2 wt % of its weight. The weight loss can be calculated for example by thermogravimetric analysis (TGA; 20° C./min).

For the purpose of the present description and of the appended claims, the values of modulus of elasticity E' and Tg are meant to be determined by means of Dynamic Mechanical Thermal Analysis (DMTA) in tension. Tg is derived from the DMTA curve obtained by on-set point method.

BRIEF DESCRIPTION OF THE DRAWING

FIG. 1 is a graph showing the curing behavior of exemplary coatings of the disclosure.

DETAILED DESCRIPTION OF THE INVENTION

According to the invention, a suitable reactant (A) is a carboxylic acid, a triglyceride, or a mixture thereof, having a $C_{16}$-$C_{24}$ aliphatic chain comprising at least two conjugated double bonds. The Applicant has observed that a reactant (A) lacking chains with at least two conjugated double bonds is unsuitable for the purpose of the present invention, as the polyester derived by its esterification with a polyol as the reactant (B) is either not sufficiently crosslinkable or is crosslinkable only after curing times too long for a convenient industrial application.

Preferably, the carboxylic acid having a $C_{16}$-$C_{24}$ aliphatic chain comprising at least two conjugated double bonds as reactant (A) is a monocarboxylic acid.

For example, the carboxylic acid having a $C_{16}$-$C_{24}$ aliphatic chain comprising at least two conjugated double bonds as reactant (A) is alpha-eleostearic acid (α-ESA; 9Z11E13E-18:3), calendic acid (8E10E12Z-18:3), punicic acid (9E11E13Z-18:3) or licanic acid (4-keto-octadeca-9,11, 13-trienoic acid). Alpha-eleostearic acid is preferred.

In an embodiment of the invention, the reactant (A) is a triglyceride or a mixture of triglycerides comprising at least one $C_{16}$-$C_{24}$ aliphatic chain comprising at least two conjugated double bonds. Vegetable oils or seed oils can contain such triglycerides or mixture of triglycerides in an amount of from 30 wt % to 80 wt %.

Advantageously, the reactant (A) is a mixture of triglycerides containing at least 70% by weight, based on the total weight of said mixture, of at least one $C_{16}$-$C_{24}$ aliphatic chain comprising at least two conjugated double bonds. When the amount of $C_{16}$-$C_{24}$ aliphatic chains comprising at least two conjugated double bonds in an oil is lower than 70 wt %, known techniques can be applied to concentrate the polyunsaturated conjugated part, e.g. by fractional crystallization.

Mixture of triglycerides having the above amount of $C_{16}$-$C_{24}$ aliphatic chains comprising at least two conjugated double bonds are commercially available, e.g. as tung oil, pomegranate seed oil, calendula oil, and their mixtures.

The use of a triglyceride or a mixture thereof as reactant (A) can be advantageous with respect to the use of a carboxylic acid, since triglycerides are usually more readily available and less expensive that the corresponding carboxylic acids.

The reactant B, which is a polyol having at least 3 hydroxyl groups, the polyol being thermally stable up to 300° C., is preferably a polyol having from 3 to 9, more preferably from 3 to 6 hydroxyl groups.

The hydroxyl groups of the polyol can be primary, secondary or tertiary hydroxyl groups, preferably primary or secondary hydroxyl groups, more preferably primary hydroxyl groups. Primary hydroxyl groups show the highest reactivity among the three kinds of hydroxyl groups. Thermally stable polyols are known in the art.

Examples of reactant (B) according to the invention are glycerol ethoxylate, glycerol propoxylate, trimethylolpropane ethoxylate, dipentaerythritol, and mixtures thereof.

Preferably, glycerol ethoxylate and glycerol propoxylate have an average number molecular weight (Mn) of from 800 to 1,200 (determined by GPC analysis).

Preferably, trimethylolpropane ethoxylate has an average number molecular weight (Mn) of from 100 to 1,200.

Advantageously, the reactant (B) according to the invention is in liquid form at room temperature. The liquid form of the reactant (B) promotes the physical admixture with the reactant (A) and helps to obtain of a polyester with a homogeneous appearance.

The polyol as reactant (B) of the invention is thermally stable up to 300° C. The polyol as reactant (B) of the invention can be thermally stable even at temperatures over the given limit, but its stability within the above mentioned limit is to be present.

To prepare the polyesters of the invention, reactants (A) and (B) are reacted under esterification conditions.

Preferably, when reactant (A) is a carboxylic acid with a $C_{16}$-$C_{24}$ aliphatic chain comprising at least two conjugated double bonds, the ratio between reactant (A) and reactant (B) is of one mole of reactant (A) per each hydroxyl group contained in the reactant B.

The number of hydroxyl group contained in reactant (B) can be determined by known methods for measuring the content of free hydroxyl groups in a chemical substance, which are usually based on the number of milligrams of potassium hydroxide required to neutralize the acetic acid taken up on acetylation of one gram of a chemical substance that contains free hydroxyl groups.

When reactant (A) is a triglyceride, or a mixture of triglycerides, having a $C_{16}$-$C_{24}$ aliphatic chain comprising at least two conjugated double bonds, the esterification between reactants (A) and (B) to prepare the polyesters of the invention is a transesterification reaction. The reaction conditions are substantially the same employed for the esterification reaction between reactants (A) and (B), when the first is a carboxylic acid.

Preferably, when reactant (A) is a triglyceride, or a mixture of triglycerides, having at least one $C_{16}$-$C_{24}$ aliphatic chain comprising at least two conjugated double bonds, the reactant (A) is made to react with reactant (B) in a molar ratio A/B within the range from 1:1 to 1:3, wherein A is expressed as number of moles of triglycerides having at least one chain comprising at least two conjugated double bonds and B is expressed as number of moles of polyol.

The esterification reaction can be carried out using the techniques and the devices well known to the person skilled in the art. Preferably, the esterification reaction between the reactant (A) and the reactant (B) is carried out in the presence of a catalyst, such as an acid or a base, preferably a base, suitable for the esterification of carboxylic acids or triglycerides with polyols. Examples of catalysts are: metal hydroxides, alkoxides and carbonates, alkaline tert-butoxide, rare earth oxides, rare earth salts and transition metal salts, organometallics, amines, guanidines and the like.

Advantageously, the catalyst of the present esterification reaction is in liquid form at room temperature.

Preferably the catalyst of the present esterification reaction is a tin or a titanium catalyst. Examples of catalyst preferred according to the invention are: organotin oxides, hydroxides, and alkoxides (such as dibutyltin oxide, dibutyltin laurate, dibutyltin dilaurate), titanium tetraisopropoxide and mixtures thereof.

Preferably, the catalyst is used in an amount within the range of from 0.1 to 3 mol %, based on the total moles of the carboxylic acid present in the reaction mixture, when the carboxylic acid is used as such, or from 0.1 to 0.8 mol % of triglycerides present in the reaction mixture.

The esterification reaction is carried out at a temperature preferably within the range from 50° C. to 250° C.

Preferably, the esterification reaction is carried out at a pressure within the range from 1 atm to 4 atm.

Preferably, the esterification reaction time is within the range from 2 hours to 48 hours.

Preferably, the esterification reaction is carried out in the absence of any added solvent so as to avoid any contamination of the polymer coating applied on the optical waveguide.

Preferably, the polyester of the present invention is thermally cured. Thermal curing can be carried out by applying thermal radiation (e.g. infrared radiation) or by heat transfer (e.g. heat transfer from a heated fluid, for instance hot air). Thermal curing is preferably carried out at a temperature up to 300° C., more preferably within the range of 80° C. to 300° C. and even more preferably within the range of 120° C. to 300° C.

Alternatively, the polyester of the present invention may be radiation cured, e.g. by applying ultraviolet radiation, X-rays, electron beams, and the like. According to another possible embodiment, the polyester of the present invention may be cured by thermal curing combined with radiation curing.

According to the present invention, the step of curing the polyester obtained from step (a) in carried out in the presence of a transition metal salt, so as to crosslink said polyester and to form the coating. The transition metal is selected from: Mn, Fe, Co, Cu and Ni.

As regards the counterion of the transition metal, it may be inorganic, such as chloride, bromide, iodide, sulphate, phosphate, carbonate.

Preferably, the counterion of the transition metal is an organic anion, such as: $C_2$-$C_{18}$ carboxylates; acetylacetonate.

The use of an organic anion is advantageous since it promotes the dissolution or the dispersion of the transition metal salt into the polyester obtained from step (a) of esterification.

Preferably, the transition metal salt is present in an amount ranging from 100 ppm to 2000 ppm, more preferably from 200 ppm to 1000 ppm.

To avoid premature curing of the polyester, the transition metal salt is added to the polyester after completing step (a) and thoroughly mixed to obtain a complete and stable dissolution or dispersion of the accelerator into to polymer.

The mixing is preferably carried out at a temperature from 20° C. to 120° C., more preferably from 50° C. to 90° C. To improve dissolution or dispersion of the transition metal salt into the polyester obtained from step (a), the transition metal salt is preferably pre-dispersed into an organic phase, more preferably into a long chain carboxylic acid or a triglyceride, or mixtures thereof. Preferably, the long chain carboxylic acid or triglyceride is selected from those used as reactants (A) according to the present invention.

The transition metal salt acts as curing accelerator, i.e. it increases the curing rate so as to match the optical fibre drawing speed, the temperature of the glass exiting the drawing step and the drawing tower height commonly used in industrial plants for optical fibre production. This makes the process for producing the optical fibres according to the present invention particularly advantageous in terms of productivity, while allowing operating at a lower temperature during curing with respect to a corresponding process wherein the transition metal salt is ab sent.

The curing of the polyester can take place also by crosslinking in the presence of oxygen. Oxygen can behave as crosslinking initiator or adjuster. The desired final properties of the cured polymer can be adjusted also by varying both the curing temperature and the curing time, as these two parameters influence the crosslinking density of the curing reaction and thus the degree of crosslinking of the polymer.

Optionally, the curing of the polyester can be carried out in the presence of a thermal free-radical initiator. A cationic initiator can be concurrently employed.

Preferably, thermal initiators having an activation temperature within the range of from 60° C. to 300° C. are used. Examples of thermal initiators that can be used for the purpose of the present invention are: 2,2'-azobis(2-methyl-propio-nitrile), meso-1,2-dibromo-1,2-diphenyl ethane, tretraalkyl-1,2-diphenylethanes. Examples of cationic initiators that can be used for the purpose of the present invention are iodonium derivatives.

When a thermal initiator is used, a thermocurable composition comprising a polyester and a thermal initiator is prepared, wherein said initiator is preferably present in an amount of from 0.3 wt % to 8 wt %, more preferably from 0.5 wt % to 5 wt %, based on the weight of the thermocurable composition.

According to a second preferred embodiment, the cured polymer material of the coating is obtained by UV-curing the polyester of the present invention, particularly in the presence of a photoinitiator. Conventional photoinitiators can be used in the present invention. Examples of suitable photoinitiators include benzophenone and/or acetophenone derivatives, such as alpha-hydroxy alkylphenyl ketones, benzoin alkyl ethers and benzyl ketals, monoacylphosphine oxides, and bisacylphosphine oxides. Preferred photoinitiators are 1-hydroxycyclohexyl phenyl ketone, 2-hydroxy-2-methyl-1-phenyl-propan-1-one, and diphenyl(2,4,6-trimethylbenzoyl) phosphine oxide.

When a photoinitiator is used, a UV-curable composition comprising a polyester and a photoinitiator is prepared, wherein said photoinitiator is present in an amount of from 0.3 wt % to 8 wt %, more preferably from 0.5 wt % to 5 wt %, based on the weight of the curable composition.

The curable coating compositions of the present invention can also include other conventional additives in effective amounts. For example, additives such as stabilizers, levelling agents, adhesion promoters, chain transfer agents, colorants including pigments and dyes, viscosity adjusters, wettability adjusters, and the like can be used.

The curable composition of the present invention can be prepared by mixing the components with any suitable method known in the art.

After curing, the polymers obtained have mechanical properties, elasticity and adhesion properties which make them suitable as coating layers for optical fibres. Particularly, the cured polymer materials of the present invention have modulus of elasticity (E') and glass transition temperature which fulfill the requirements for use as primary coating layers, secondary coating layers or single coating layers. Preferably, the coating materials of the present invention are used as primary coating layers and single coating layers.

When used as primary coating layer, the cured polymer material of the present invention preferably has a modulus of elasticity (E') at 25° C. of from 0.01 to 5 MPa, more preferably of from 0.05 to 5 MPa, and a glass transition temperature (Tg) of −20° C. at most, preferably of −30° C. at most.

When used as single coating layer, the cured polymer material of the present invention preferably has a modulus of elasticity (E') at 25° C. of from 20 to 200 MPa, more preferably of from 30 to 150 MPa, and a glass transition temperature (Tg) of 20° C. at most, preferably of 0° C. at most.

When used as secondary coating layer, the cured polymer material of the present invention preferably has a modulus of elasticity (E') at 25° C. of from 500 to 2000 MPa, and a glass transition temperature (Tg) greater than 50° C.

When the polyester of the present invention is used to form a primary coating on an optical fibre, a secondary coating surrounding said primary coating can also be applied using the polymer materials conventionally used in the art for the manufacturing of secondary coatings, for example a UV curable acrylate secondary coating.

A secondary coating usable in the fibre of the present invention in combination with a thermally curable primary coating can comprise a polymer selected from: methacrylate polymer, acrylate polymer and mixtures thereof. In particular, the secondary coating comprises urethane acrylate polymers which can be obtained, for instance, by radiation curing a radiation curable composition comprising an oligomer having a backbone derived from polypropylene glycol and a dimer acid based polyester polyol. A material suitable for the secondary coating of the optical fibre of the invention is disclosed in WO 2012/036546 or is marketed by DeSolite® 3471-2-136.

The manufacturing of the coated optical fibre according to the present invention can be carried out according to known techniques. For example, after drawing of the optical waveguide a primary coating can be applied by passing the optical waveguide through a sizing die and a reservoir containing the curable composition according to the present invention. When a thermally curable composition is used, the application can advantageously be done when the optical waveguide has a suitable temperature, e.g. from 150° C. to 300° C., so as to exploit the heat of the drawn optical waveguide to obtain the final cured polymer material. When a radiation curable polymer or composition is applied, the application step is followed by radiation curing (e.g. by UV or IR) of the applied composition so as to obtain the final polymer material. In the case of deposition of both a primary and a secondary coating, the latter is applied on the primary coating before or after the curing of the secondary coating (by techniques known as wet-on-dry or wet-on-wet deposition).

An optical fibre thus produced may be used in the production of optical cables. The fibre may be used either as such or in the form of ribbons comprising several fibres combined together by means of a common coating.

The present description shows only some embodiments of a coated optical fibre according to the invention. Suitable modifications can be made to these embodiments according to specific technical needs and application requirements without departing from the scope of the invention.

The present disclosure will become fully clear after reading the following example, with reference to the attached FIG. 1 showing the curing behaviour of some coatings of the disclosure.

EXAMPLES

Polyesters according to the present invention were prepared using the following procedure.

A reaction mixture was prepared by mixing at ambient temperature (25° C.) a triglyceride, a polyol and an esterification catalyst.

The triglyceride was tung oil, i.e. a mixture of α-eleostearic acid 82 wt %, linoleic acid 8 wt %, palmitic acid 5 wt %, oleic acid 5 wt % (weight percentages referred to the weight of the oil).

The polyol was TMPE 170 (trimethylolpropane ethoxylate: average number molecular weight (Mn)=170) having formula:

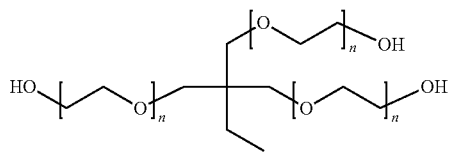

Trimethylolpropane ethoxylate_170 = TMPE_170

The esterification catalyst was dibutyl tin laurate (DBTL).
The amounts of the above reactants and catalyst were the following:

| | |
|---|---|
| tung oil | 70 wt % |
| TMPE 170 | 29 wt % |
| DBTL | 1 wt % | the wt % being expressed with respect to the total weight of the composition. The esterification reaction was carried out at a temperature of 150° C. for 12 hours.

After the esterification reaction, samples of the resulting polyester were added with different accelerators in the amounts as reported in Table 1. The mixing of the accelerator with the polyester was carried out at 70° C. for a time sufficient to achieve complete dispersion of the transition metal salt.

TABLE 1

| Sample | Accelerator | Accelerator amount (mol %) (*) |
|---|---|---|
| 1 | Cu(II) acetylacetonate | 1 |
| 2 | Co(III) acetylacetonate tetrahydrate | 1 |
| 3 | Co(II) decanoate | 0.5 |
| 4 | Fe(III) acetylacetonate | 0.5 |
| 5 | Ni(II) carbonate | 0.25 |

(*) % moles of transition metal with respect to the total moles of fatty acids present in the triglyceride.

The curing rate of the resulting compositions was evaluated by means of a parallel plate rheometer (TA Instruments AR 2000ex) under heating at a temperature of 200° C. (curing temperature). The shear storage modulus (G') was measured as a function of time. The curves are reported in FIG. 1, wherein G' (expressed in Pa, in ordinate) is reported as a function of time (sec, in abscissa). The numbering of the curves in FIG. 1 relates to the samples of Table 1.

As reference, a sample of the polyester obtained after esterification devoid of any accelerator was also analyzed (the curing curve is also reported in FIG. 1 as "A").

In the following Table 2 the values of the cure onset time (corresponding to the point at which the curing is starting, with an appreciable increase of the G' value) are also reported. It is apparent that the addition of the accelerator remarkably reduced the time at the cure onset, and therefore an acceleration of the curing process was achieved.

TABLE 2

| Sample | Cure onset time (sec) |
|---|---|
| A | 989 |
| 1 | 196 |
| 2 | <30 |
| 4 | 84 |
| 5 | <30 |

For each cured polyester sample, films were obtained using an automatic coater with micrometric blade settled in order to obtain film thickness from 50 to 200 microns. The modulus of elasticity (E') at −30° C., +25° C. and +100° C. and the glass transition temperature (Tg–onset point) of each of the cured film as determined by means of DMTA analysis are reported in Table 3.

Comparative results obtained on films of commercial primary coating C1 (DP1014-XS by DSM) and single coating SC (3471-3-14 by DSM) compositions are also reported in Table 3. These reference materials were cured by UV radiation using the curing conditions indicated by the supplier.

TABLE 3

| | E' (MPa) | | | |
|---|---|---|---|---|
| Sample | −30° C. | +25° C. | +100° C. | Tg (° C.) |
| 1 | 133.1 | 1.209 | 0.664 | −37.24 |
| 2 | 7.048 | 0.2686 | 0.326 | −44.60 |
| 3 | 1018 | 123.7 | 2.620 | −41.93 |
| 4 | 137.3 | 0.7783 | 1.171 | −40.74 |
| C1 | 33.33 | 0.882 | 1.12 | −46.7 |
| SC | 1300 | 200 | <3 | 5 |

The invention claimed is:

1. An optical fibre comprising:
   an optical waveguide comprising a glass core surrounded by a glass cladding; and
   a coating surrounding said optical waveguide comprising a polymer material comprising a cured polyester obtained by:
   (a) esterification of a reactant (A) selected from the group consisting of carboxylic acids, triglycerides, and mixtures thereof, having a $C_{16}$-$C_{24}$ aliphatic chain comprising at least two conjugated double bonds, with a reactant (B) selected from the group consisting of polyols having at least 3 hydroxyl groups, the polyols being thermally stable up to 300° C., to obtain a polyester; and
   (b) curing of the obtained polyester, in the presence of a transition metal salt, the transition metal being selected from the group consisting of Mn, Fe, Co, Cu, and Ni.

2. The optical fibre according to claim 1, wherein said step of curing is a thermal curing.

3. The optical fibre according to claim 2, wherein thermal curing is carried out at a temperature within the range of 80° C. to 300° C.

4. The optical fibre according to claim 1, wherein the reactant (A) is a monocarboxylic acid.

5. The optical fibre according to claim 1, wherein the reactant (A) is an acid selected from the group consisting of alpha-eleostearic acid, calendic acid, punicic acid and licanic acid.

6. The optical fibre according to claim 1, wherein the reactant (A) is a mixture of triglycerides containing at least 70 wt %, based on the total weight of said mixture, of $C_{16}$-$C_{24}$ aliphatic chains comprising at least two conjugated double bonds.

7. The optical fibre according to claim 1, wherein the reactant (B) is a polyol having from 3 to 9 hydroxyl groups.

8. The optical fibre according to claim 1, wherein the hydroxyl groups of the polyols are primary hydroxyl groups.

9. The optical fibre according to claim 1, wherein said reactant (B) is selected from the group consisting of: glycerol ethoxylate, glycerol propoxylate, trimethylolpropane ethoxylate, dipentaerythritol and mixtures thereof.

10. The optical fibre according to claim 1, wherein the transition metal salt is present in an amount ranging from 100 ppm to 2000 ppm.

11. The optical fibre according to claim 1, wherein said coating is selected from the group consisting of: a primary coating and a single coating.

12. The optical fibre according to claim 1, wherein said coating is a primary coating which is surrounded by a secondary coating, said secondary coating comprising a polymer selected from the group consisting of: methacrylate polymer, acrylate polymer and mixtures thereof.

13. A process for coating an optical fibre comprising:
   providing an optical waveguide comprising a glass core surrounded by a glass cladding;
   applying a curable coating composition on the cladding, said coating composition comprising a polyester obtained by esterification of a reactant (A) selected from the group consisting of carboxylic acids, triglycerides, and mixtures thereof, having a $C_{16}$-$C_{24}$ aliphatic chain comprising at least two conjugated double bonds, with a reactant (B) selected from the group consisting of polyols having at least 3 hydroxyl groups, the polyols being thermally stable up to 300° C.;
   curing said curable coating composition in the presence of a transition metal salt, the transition metal being selected from the group consisting of Mn, Fe, Co, Cu, and Ni, so as to crosslink said polyester and to form the coating.

14. The process for coating an optical fibre according to claim 13, wherein reactant (A) is a carboxylic acid having a $C_{16}$-$C_{24}$ aliphatic chain comprising at least two conjugated double bonds, and the ratio between reactant (A) and reactant (B) is of one mole of reactant A per each hydroxyl group comprised in the reactant B.

15. The process for coating an optical fibre according to claim 13, wherein reactant (A) is a triglyceride or mixture of triglycerides containing at least one $C_{16}$-$C_{24}$ aliphatic chain comprising at least two conjugated double bonds, and the reactant A is made to react with reactant (B) in a molar ratio A/B within the range from 1:1 to 1:3, wherein A is expressed as number of moles of triglycerides having at least one chain comprising at least two conjugated double bonds and B is expressed as number of moles of polyol.

16. The process for coating an optical fibre according to claim 13, wherein curing of the curable composition is a thermal curing at a temperature up to 300° C.

* * * * *